US012560778B2

(12) United States Patent
Hong

(10) Patent No.: US 12,560,778 B2
(45) Date of Patent: Feb. 24, 2026

(54) REFLECTION MODULE AND CAMERA MODULE INCLUDING THE SAME

(71) Applicant: SAMSUNG ELECTRO-MECHANICS CO., LTD., Suwon-si (KR)

(72) Inventor: Jong Woo Hong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 418 days.

(21) Appl. No.: 18/108,210

(22) Filed: Feb. 10, 2023

(65) Prior Publication Data

US 2023/0350160 A1 Nov. 2, 2023

(30) Foreign Application Priority Data

Apr. 29, 2022 (KR) ........................ 10-2022-0053574

(51) Int. Cl.
| | | |
|---|---|---|
| *G02B 7/18* | (2021.01) | |
| *G02B 7/182* | (2021.01) | |
| *G02B 13/00* | (2006.01) | |
| *G02B 27/64* | (2006.01) | |

(52) U.S. Cl.
CPC ......... *G02B 7/182* (2013.01); *G02B 13/0065* (2013.01); *G02B 27/646* (2013.01)

(58) Field of Classification Search
CPC ... G02B 7/182; G02B 13/0065; G02B 27/646
USPC ........................................................ 359/871
See application file for complete search history.

(56) References Cited

U.S. PATENT DOCUMENTS

| | | |
|---|---|---|
| 2020/0396358 A1 | 12/2020 | Park et al. |
| 2021/0116787 A1 | 4/2021 | Hwang |
| 2021/0294184 A1* | 9/2021 | Kim ........................ G03B 17/17 |
| 2022/0236518 A1* | 7/2022 | Smirnov ................ G03B 17/17 |
| 2023/0367135 A1 | 11/2023 | Park |
| 2024/0069306 A1* | 2/2024 | Im .......................... G02B 7/182 |

FOREIGN PATENT DOCUMENTS

| | | |
|---|---|---|
| KR | 10-2020-0143187 A | 12/2020 |
| KR | 10-2021-0017272 A | 2/2021 |
| KR | 10-2021-0045252 A | 4/2021 |
| KR | 10-2021-0060392 A | 5/2021 |
| KR | 10-2022-0036584 A | 3/2022 |

OTHER PUBLICATIONS

Machine translation of the description of KR20210060392A, which was published May 26, 2021.*
Korean Office Action issued on Nov. 6, 2023, in counterpart Korean Patent Application No. 10-2022-0053574 (7 pages in English, 5 pages in Korean).

* cited by examiner

*Primary Examiner* — Daniel A Hess
(74) *Attorney, Agent, or Firm* — NSIP Law

(57) ABSTRACT

A camera module including a housing, a reflection module including a reflection member and a holder on which the reflection member is mounted, the reflection module being disposed in the housing and rotating about an axis perpendicular to an optical axis, a first magnet and a second magnet mounted on a surface of the holder, a first coil mounted on the housing to face the first magnet and the second magnet, and a first position sensor mounted on the housing to face the first magnet.

20 Claims, 12 Drawing Sheets

1000

REFLECTION MODULE AND CAMERA MODULE INCLUDING THE SAME

CROSS-REFERENCE TO RELATED APPLICATIONS

This application claims the benefit under 35 USC 119(a) of Korean Patent Application No. 10-2022-0053574, filed on Apr. 29, 2022, in the Korean Intellectual Property Office, the entire disclosure of which is incorporated herein by reference for all purposes.

BACKGROUND

1. Field

The present disclosure relates to a reflection module and a camera module including the same.

2. Description of the Background

A camera module may be basically adopted in portable electronic devices including smartphones, and as portable electronic devices may be manufactured to have a thin thickness, miniaturization of the camera module may also be an objective.

Meanwhile, autofocusing (AF) function, and an optical image stabilization (01S) function, and the like, may be added to the camera module, therefore, there may be a limit to reducing the size of the camera module.

That is, the camera module may be difficult to reduce in size despite the objective for miniaturization, and thus there may be a limit to reducing the thickness of the portable electronic device.

A camera module having a structure including a plurality of lenses disposed in a longitudinal or width direction of a portable electronic device and a reflection member for changing a path of light may be of interest.

In this structure, since the quality of the camera module may depend on a position of the reflection member, accurately sensing the position of the reflection member may be an objective.

To this end, a sensing magnet may be provided separately from a driving magnet. In this case, even though an effect of an electromagnetic field may be reduced, there may still be a limit to improving sensing accuracy of the reflection member due to a cumulative assembly tolerance, a dent due to an external impact, and the like.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a reflection module including a reflection member and a holder on which the reflection member is mounted, the reflection module being disposed in the housing and rotating about an axis perpendicular to an optical axis, a first magnet and a second magnet mounted on a surface of the holder, a first coil mounted on the housing to face the first magnet and the second magnet, and a first position sensor mounted on the housing to face the first magnet.

The first magnet may include a first region including a portion facing the first coil and a second region including a portion facing the first position sensor sequentially in a second axis direction perpendicular to the optical axis.

The first magnet may include a first polarity region, a neutral region, and a second polarity region sequentially in the second axis direction, and the first region may include the first polarity region, and the second region may include the neutral region and the second polarity region.

The first polarity region may have a longer length than the second polarity region in the second axis direction.

The second magnet may include a surface facing the first coil provided only with a second polarity region.

The second magnet may be disposed to be spaced apart from the first polarity region of the first magnet in an optical axis direction.

The first magnet may have a longer length than the second magnet in a second axis direction, perpendicular to the optical axis.

A rotation axis of the reflection module may be formed between the housing and the holder, and the first magnet may be disposed in a position further from the rotation axis than the second magnet in an optical axis direction.

The camera module may further include a third magnet mounted on an other surface of the holder, and a second coil and a second position sensor may be mounted on the housing to face the third magnet.

The first magnet, the second magnet, and the first coil may generate driving force for rotating the reflection module about a second axis perpendicular to the optical axis, and the third magnet and the second coil may generate driving force for rotating the reflection module about a first axis perpendicular to the optical axis.

The first position sensor may sense a position of the reflection module in the second axis direction, and the second position sensor may sense a position of the reflection module in the first axis direction.

In another general aspect, a reflection module includes a reflection member, a holder on which the reflection member is mounted, a housing in which the holder is accommodated, and a driving unit for rotating the holder, based on a first axis and a second axis perpendicular to each other, wherein the driving unit includes a first coil and a second coil disposed in the housing, and three magnets disposed in the holder, wherein the first coil is disposed to face two magnets among the three magnets, wherein the second coil is disposed to face the other one magnet among the three magnets, and wherein any one of the two magnets is facing a first position sensor.

The first magnet may include a first polarity region, a neutral region, and a second polarity region sequentially in the second axis direction, and the second magnet may include the first polarity region or the second polarity region.

The first magnet may include a first region including a portion facing the first coil and a second region including a portion facing the first position sensor, and the first region may include the first polarity region, and the second region may include the neutral region and the second polarity region.

The first coil may be disposed to face a region of different polarities of the first magnet and the second magnet.

The first polarity region may have a longer length than the second polarity region in the second axis direction.

In another general aspect, a camera module includes a holder rotatable relative to a housing about a first axis perpendicular to an optical axis, first and second driving magnets disposed on a side surface of the holder facing the first axis direction and spaced apart from each other in the optical axis direction, and a position sensor facing the first driving magnet in the first axis direction, wherein the first driving magnet is longer than the second driving magnet in a second axis direction perpendicular to the first axis and the optical axis, and wherein the first driving magnet extends beyond the second driving magnet in the second axis direction to face the position sensor.

The first driving magnet may include a first polarity and a second polarity spaced apart from the first polarity by a neutral region, and the first polarity may face the second driving magnet, and the second polarity may face the position sensor.

The camera module may further include a driving coil facing the first and second driving magnets in the first axis direction, wherein electromagnetic force between the driving coil and the first and second driving magnets may rotate the holder about the second axis.

The camera module may further include a reflection member disposed on the holder to change a direction of incident light.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
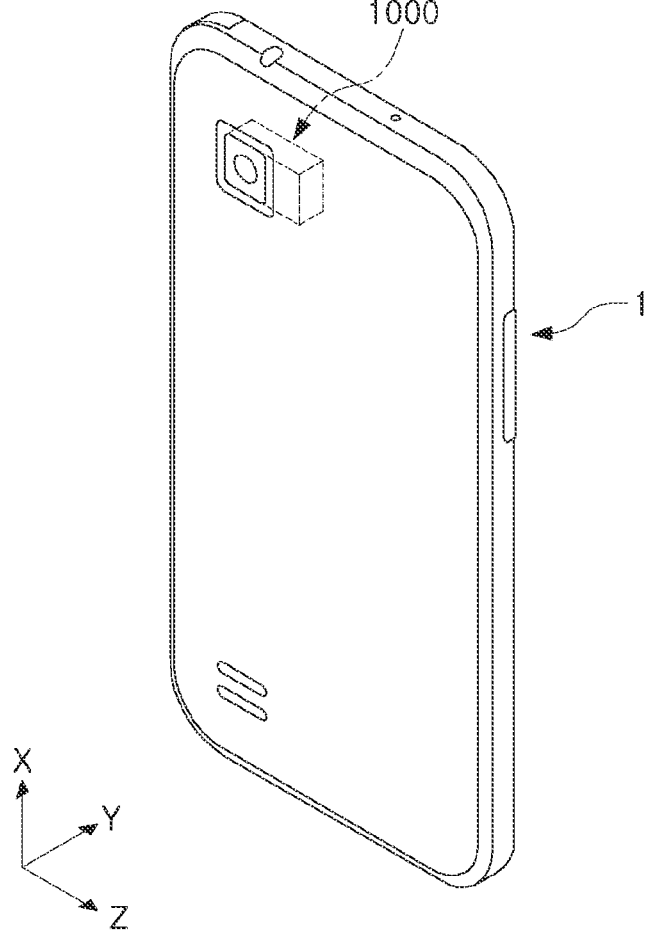
FIGS. 1A and 1B are perspective views of a portable electronic device in which a camera module is mounted according to an embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure is to provide a camera module capable of improving position sensing accuracy of the reflection module.

Figure 1B:
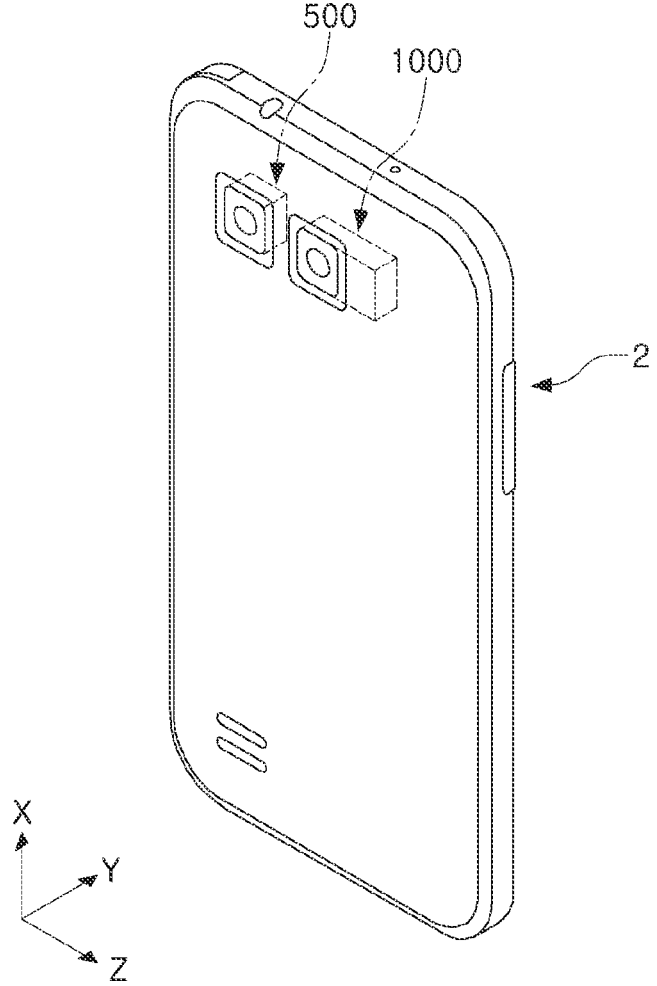

FIGS. 1A and 1B are perspective views of a portable electronic device in which a camera module 1000 according to an embodiment in the present disclosure is mounted.

Referring to FIG. 1A, a camera module 1000 according to an embodiment of the present disclosure may be mounted on a portable electronic device 1. Although a smartphone is illustrated as an example of the portable electronic device 1 in the drawing, the portable electronic device 1 is not limited thereto, and is not limited to a specific product as long as it is a portable electronic device such as a tablet PC or a notebook computer.

As illustrated in FIG. 1, the portable electronic device 1 is equipped with the camera module 1000 to image a subject.

According to an embodiment of the present disclosure, the camera module 1000 may include a plurality of lenses. The plurality of lenses refers to a direction of the portable electronic device 1 in a thickness direction (a Y-axis direction based on the drawing), and may be disposed in a direction perpendicular to the thickness direction, from a front surface to a rear surface of the portable electronic device 1, or an opposite direction thereof. In other words, an optical axis (a Z-axis) of the plurality of lenses may be disposed in a direction perpendicular to the thickness direction of the portable electronic device 1, and in detail, may be disposed in a width direction or a longitudinal direction of the portable electronic device 1. For example, an optical axis (a Z-axis) of the plurality of lenses coincides with a Z-axis direction of the portable electronic device based on the drawing, but the disclosure is not so limited.

Accordingly, even if the camera module 1000 has functions, such as autofocusing (AF), optical zoom or zoom, and optical image stabilization (OIS), a thickness of the portable electronic device 1 may not increase when an optical axis (a Z-axis) of the plurality of lenses is disposed in a direction perpendicular to the thickness direction of the portable electronic device 1. Accordingly, the portable electronic device 1 may be thinned.

According to an embodiment of the present disclosure, the camera module 1000 may include at least one of the AF function, Zoom function, and OIS function. For example, the camera module is described herein as having all of the AF function, Zoom function, and OIS function.

Since the camera module 1000 having the AF, zoom, and OIS functions has to be provided with various parts, a size of the camera module 1000 is inevitably increased, compared to a general camera module, and as the size of the camera module 1000 increases, a size of the portable electronic device 1 on which the camera module 1000 is mounted also increases.

For example, the camera module 1000 may include a plurality of lens groups to implement an optical zoom function, and when the plurality of lens groups are disposed in the thickness direction of the portable electronic device, a thickness of the portable electronic device increases according to the number of lens groups. That is, if the thickness of the portable electronic device is not increased, since the number of lens groups may not be sufficiently secured, optical zoom performance may be weakened.

In addition, in order for the camera module 1000 to implement an autofocus function, an image stabilization function, and the like, and the camera module 100 may be provided with an actuator for moving a plurality of lens groups in an optical-axis direction (a Z-axis direction) or directions (X-axis and Y-axis directions), perpendicular to the optical axis. When the plurality of lens groups are disposed in a thickness direction of the portable electronic device, an actuator for moving the lens group should also be provided in the thickness direction of the portable electronic device, so the thickness of the portable electronic device may increase.

However, according to an embodiment of the present disclosure, since in the camera module 1000, a plurality of lenses are disposed in a direction, perpendicular to a thickness direction (a Y-axis direction) of the portable electronic device 1 so that an optical axis (a Z-axis) of the plurality of lenses are formed in a direction (the Z-axis direction) perpendicular to the thickness direction (the Y-axis direction) of the portable electronic device 1, even when the camera module 100 equipped with an autofocus adjustment function, an optical zoom function and an image stabilization function is employed in the portable electronic device 1, the thickness of the portable electronic device 1 does not increase, so that the portable electronic device 1 may be thinned.

Referring to FIG. 1B, a camera module 1000 according to an embodiment of the present disclosure may be mounted on a portable electronic device 2 together with another camera module 500. That is, the portable electronic device 2 may be equipped with a plurality of camera modules 500 and 1000, and any one or any more than one of the plurality of camera modules 500 and 1000 may be a camera module 1000 according to an embodiment of the present disclosure. In addition, as described above, the portable electronic device 2 may be a portable electronic device such as a smartphone, a tablet PC, or a laptop computer.

Figure 2:
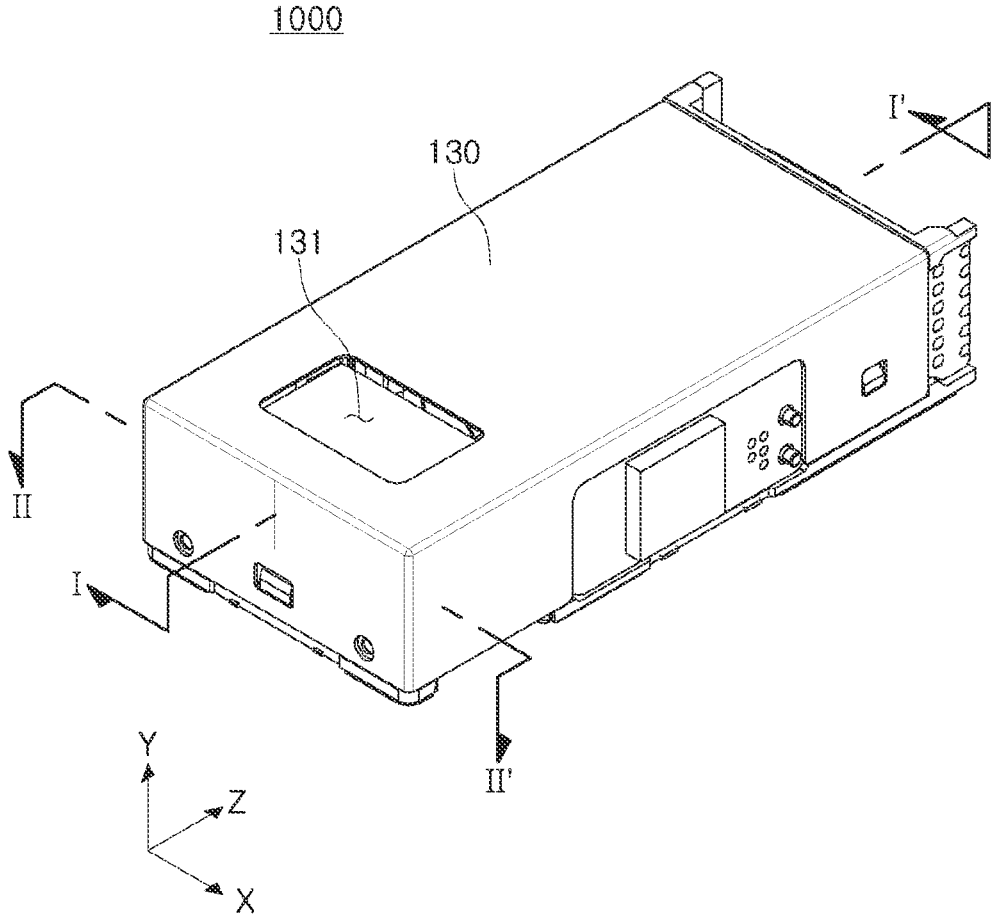
FIG. 2 is a schematic perspective view of a camera module according to an embodiment of the present disclosure.
Figures 3A, 3B:
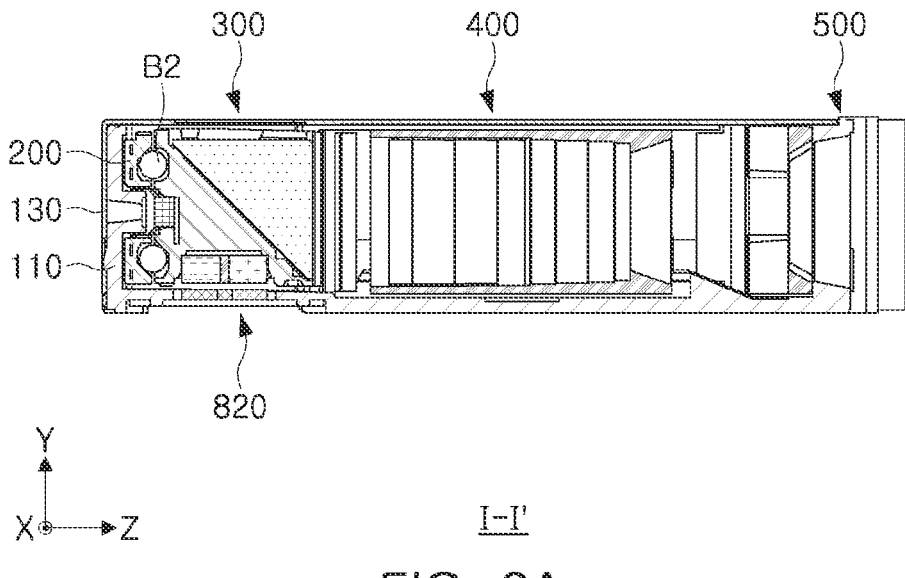
FIG. 3A is a cross-sectional view taken along line I-I' of FIG. 2.
FIG. 3B is a cross-sectional view taken along line II-II' of FIG. 2.
Figure 4:
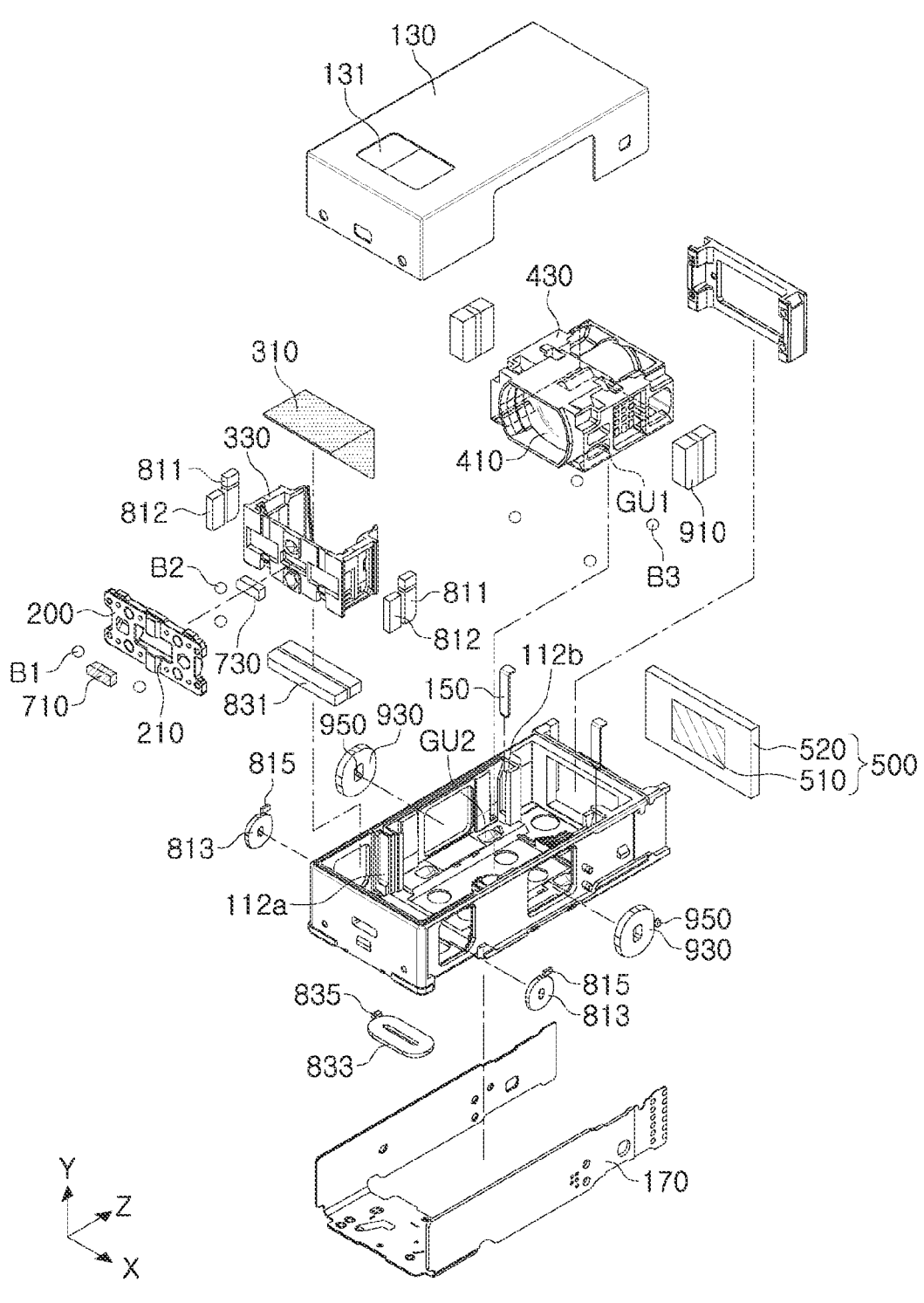
FIG. 4 is an exploded perspective view of a camera module according to an embodiment of the present disclosure.

FIG. 2 is a schematic perspective view of a camera module according to an embodiment of the present disclosure, FIG. 3A is a cross-sectional view taken along line I-I' of FIG. 2, FIG. 3B is a cross-sectional view taken along line II-II' of FIG. 2, and FIG. 4 is an exploded perspective view of a camera module according to an embodiment of the present disclosure.

Figure 5:
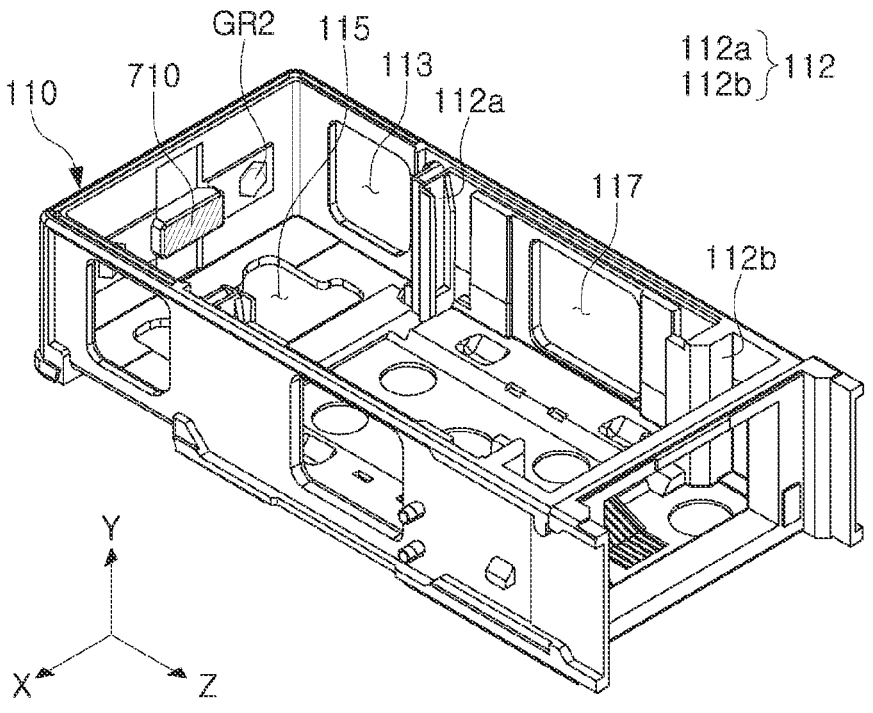
FIG. 5 is a perspective view of a housing of a camera module according to an embodiment of the present disclosure.
Figure 6:
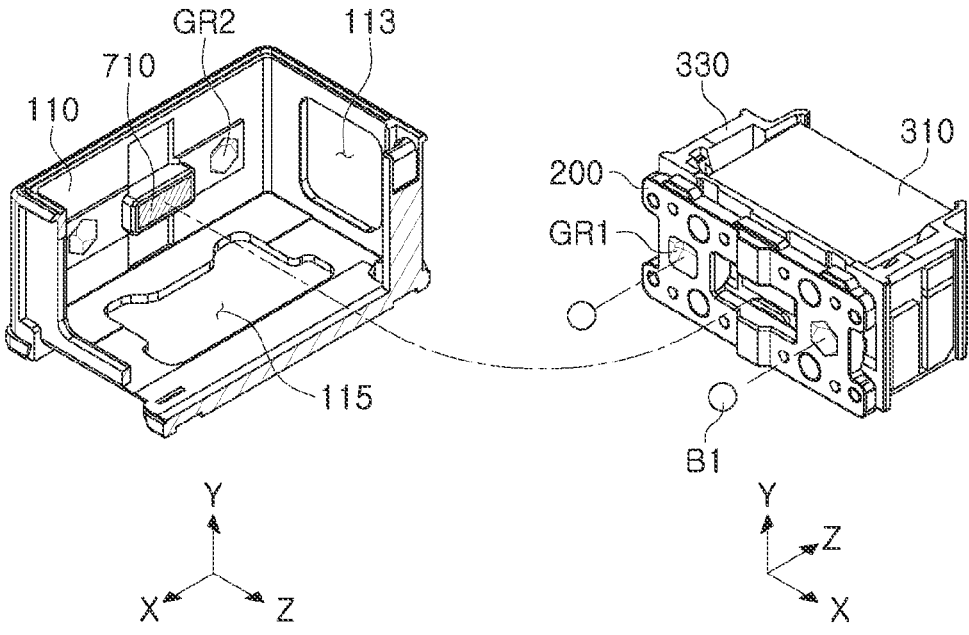
FIG. 6 is an exploded perspective view of a housing and a holder of a camera module according to an embodiment of the present disclosure.
Figure 7:
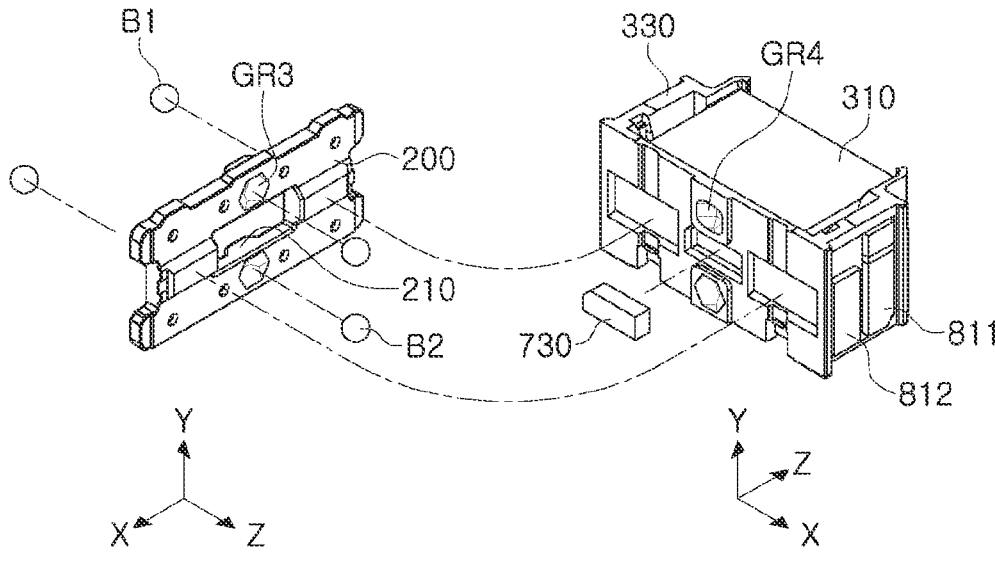
FIG. 7 is an exploded perspective view of a rotating plate and a holder of a camera module according to an embodiment of the present disclosure.
Figure 8:
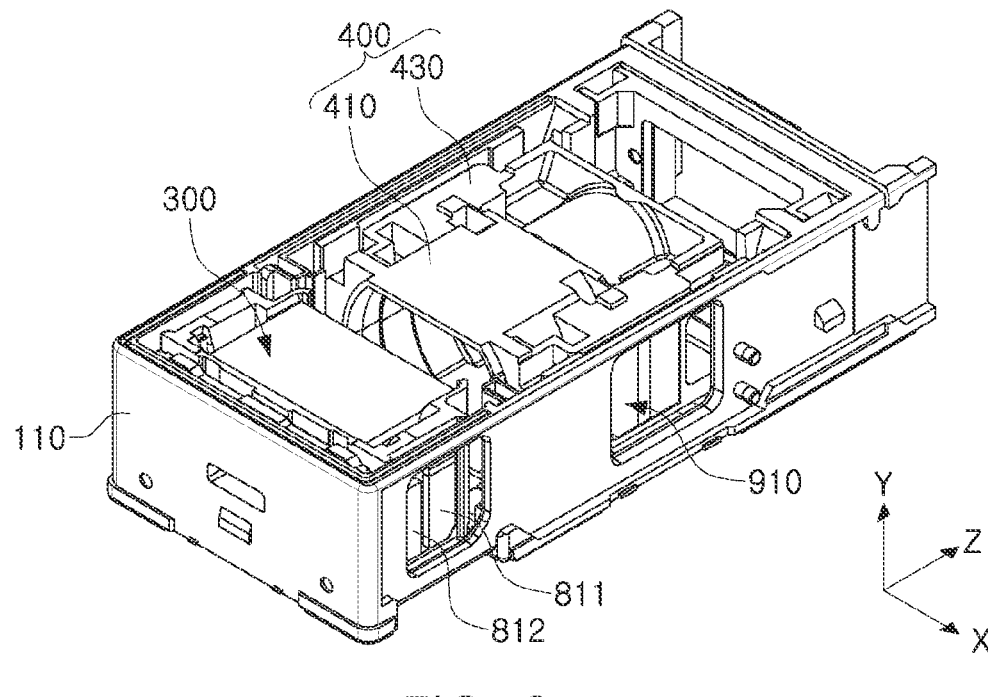
FIG. 8 is a perspective view in which a reflection module and a lens module are coupled to a housing of the camera module according to an embodiment of the present disclosure.
Figure 9:
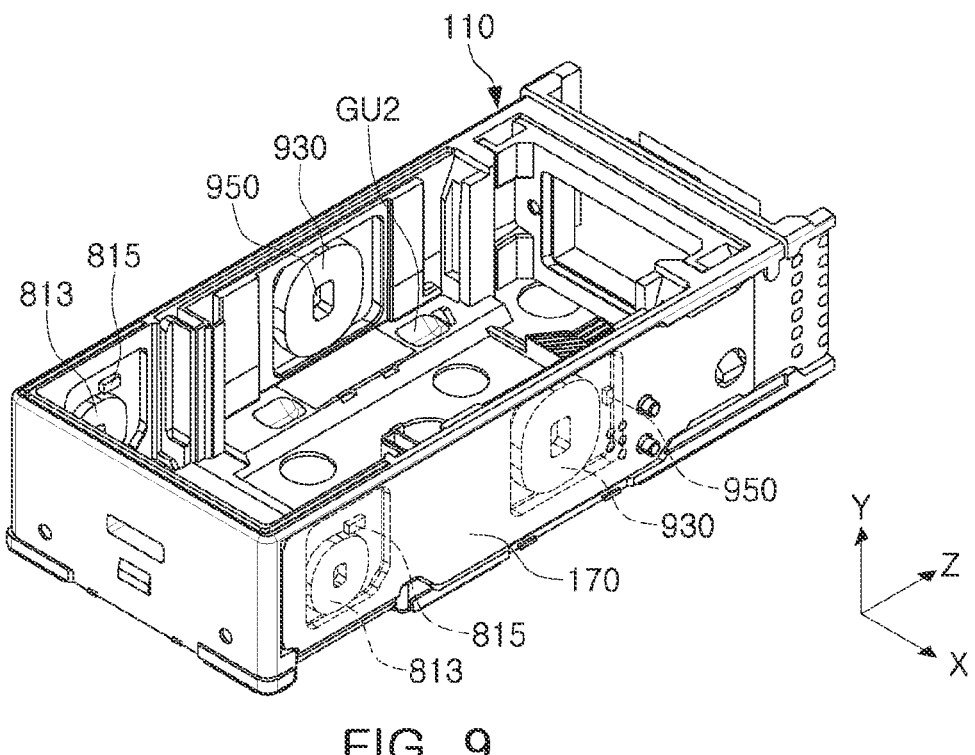
FIG. 9 is a perspective view in which a driving coil and a substrate on which an image sensor is mounted are coupled to a housing of a camera module according to an embodiment of the present disclosure.

In addition, FIG. 5 is a perspective view of a housing of a camera module according to an embodiment of the present disclosure, FIG. 6 is an exploded perspective view of a housing and a holder of a camera module according to an embodiment of the present disclosure, FIG. 7 is an exploded perspective view of a rotating plate and a holder of a camera module according to an embodiment of the present disclosure, and FIG. 8 is a perspective view in which a reflection module and a lens module are coupled to a housing of a camera module according to an embodiment of the present disclosure.

According to an embodiment of the present disclosure, a camera module 1000 may include a housing 110, a reflection module 300, a lens module 400, an image sensor module 500, and a cover 130.

The housing 110 may be a part formed of a material that is easy to be molded, for example, a plastic material.

As illustrated in FIG. 5, the housing 110 may have a box shape with an open upper portion, and may have a length or an extension shape in an optical axis direction (a Z-axis direction). The housing 110 may have an internal space, and the above components may be disposed in the internal space of the housing 110 or directly or indirectly mounted on a side surface of the housing 110.

For example, a reflection module 300, a lens module 400, and an image sensor module 500 may be sequentially disposed from one side to the other side thereof in the internal space of the housing 110. Referring to a traveling path of light, the reflection module 300 may be disposed at the forwardmost position, and the image sensor module 500 may be disposed at the rearmost position. As another example, the reflection module 300 and the lens module 400 may be disposed in the internal space of the housing 110, and the image sensor module 500 may be provided as a form of being attached to the side surface of the housing 110 from the outside of the housing 110.

Meanwhile, as another example, the reflection module 300 and the lens module 400 may be disposed in separate housings. In this case, the housing in which the reflection module 300 is disposed and the housing in which the lens module 400 is disposed may be coupled to each other. In addition, at least a portion of the housing in which the reflection module 300 is disposed and the housing in which the lens module 400 is disposed may be open so that light reflected from the reflection module 300 passes through the lens module 400.

The cover 130 may be coupled to the open upper portion of the housing 110 to cover the internal space of the housing 110. The cover 130 may protect components disposed in the internal space of the housing 110, including the reflection module 300, the lens module 400, and the image sensor module 500, from external impacts.

In addition, the cover 130 may perform a function of shielding electromagnetic waves. To this end, the cover 130 may be formed of a metal material. The cover 130 is formed of a metal material having an electromagnetic wave shielding function so that electromagnetic waves generated from the camera module 1000 according to an embodiment of the present disclosure do not affect other electronic components provided in the portable electronic device 1. Conversely, it is possible to prevent electromagnetic waves generated from other electronic components included in the portable electronic device 1 from affecting the camera module 1000 according to an embodiment of the present disclosure.

Meanwhile, the cover 130 may be disposed to face externally of the portable electronic device 1 and the housing 110 may face inwardly of the portable electronic device 1. Accordingly, the cover 130 may include an opening 131 through which light is incident. The light may be incident through the opening 131, and the traveling path may be changed by the reflection module 300.

For example, the traveling path of light incident through the opening 131 of the cover 130 may be changed to face the lens module 400 by the reflection module 300.

In detail, the traveling path of the light incident in the thickness direction (the Y-axis direction) of the portable electronic device 1 may be changed by the reflection module 300 to approximately coincide with the optical axis direction (the Z-axis direction) of the plurality of lenses.

The reflection module 300 may include a reflection member 310 and a holder 330 on which the reflection member 310 is mounted. The reflection member 310 is configured to change the traveling path of light. For example, the reflection member 310 may be provided as a mirror or prism reflecting light.

In the camera module 1000 according to an embodiment of the present disclosure, an optical image stabilization (OIS) function may be implemented by rotating the reflection member 310. Specifically, the holder 330 on which the reflection member 310 is mounted may be configured to move in directions (X-axis and Y-axis directions) perpendicular to the optical axis direction (Z-axis direction) or rotate at a predetermined angle around axes (X-axis and Y-axis) perpendicular to the optical axis (Z-axis) as rotational axes. Hereinafter, axes perpendicular to the optical axis (Z-axis) are referred to as a first axis (X-axis) and a second axis (Y-axis), respectively, and directions perpendicular to the optical axis (Z-axis) are referred to as a first-axis direction (X-axis direction) and a second-axis direction (Y-axis direction), respectively.

The lens module 400 may include a plurality of lenses 410 through which light reflected by the reflection module 300 passes, a lens barrel including the plurality of lenses 410, and a carrier 430 to which the lens barrel is mounted. The lens barrel and carrier may be provided as separate components or integrally formed as illustrated in the drawing.

In the camera module 1000 according to an embodiment of the present disclosure, an autofocus function may be implemented by moving the carrier 430. Specifically, the carrier 430 on which the plurality of lenses 410 or the lens barrel having the plurality of lenses is mounted may be configured to move in an optical axis direction (Z-axis direction).

The image sensor module 500 may include an image sensor 510 converting light passing through a plurality of lenses into an electrical signal and a printed circuit board 520 on which the image sensor 510 is mounted. In addition, the image sensor module 500 may further include an optical filter (not shown) filtering light passing through the lens module 400 and incident on the image sensor 510. For example, the optical filter may be an infrared cut filter.

A baffle to block unnecessary light that may flow into the image sensor 510 in order to reduce a flare phenomenon may be provided between the lens module 400 and the image sensor module 500, that is, at a rear end of the lens module 400. One or more baffles may be provided.

Meanwhile, the housing 110 may include a protruding wall 112 dividing a space in which the reflection module 300, the lens module 400, and the image sensor module 500 are disposed.

In detail, the protruding wall 112 may be formed in a form protruding toward an internal space of the housing 110 from both inner sidewalls of the housing 110 having a length in an optical axis direction (Z-axis direction), and may include a first protruding wall 112a and a second protruding wall 112b provided to be spaced apart in the optical axis direction (Z-axis direction).

In summary, the internal space of the housing 110 may be divided into a space in which the reflection module 300 is disposed and a space in which the lens module 400 is disposed by the first protruding wall 112a, and may be divided into a space in which the lens module 400 is disposed and a space in which the image sensor module 500 is disposed by the second protruding wall 112b.

A hook-shaped stopper 150 may be fitted into the protruding wall 112. The stopper 150 may be fitted into the protruding wall 112 such that the hook part is caught on an upper portion of the protruding wall 112.

For example, the stopper 150 may be fitted into the first protruding wall 112a. A first stopper may limit a rotation range of the holder 330 while supporting the holder 330. In this case, a certain space may be provided between the holder 330 and the first stopper so that the holder 330 may rotate.

In addition, a buffer member (not shown) may be attached to both surfaces of the stopper 150. The buffer member may be formed of an elastically deformable material, and may reduce shock and noise generated when the reflection module 300 collides with the stopper 150.

The reflection module 300 may be supported by an inner side surface of the housing 110 while being disposed in the internal space of the housing 110. For example, the reflection module 300 may be pulled toward the inner side surface of the housing 110 in an optical axis direction (Z-axis direction).

To this end, a magnetic body may be disposed on a surface of the housing 110 and the reflection module 300 facing each other in the optical axis direction (Z-axis direction), respectively. In detail, a first magnetic body may be disposed in the housing 110 and a second magnetic body may be disposed in the holder 330 of the reflection module 300.

For example, the first magnetic body disposed in the housing 110 is a pulling yoke (or first pulling yoke) 710, and may be provided in a form of a thin plate. In addition, the second magnetic body disposed in the holder 330 may be a pulling magnet (or first pulling magnet) 730.

The first pulling yoke 710 and the first pulling magnet 730 may be disposed to face each other in the optical axis direction (Z-axis direction) to generate attractive power in the optical axis direction (Z-axis direction). Accordingly, the reflection module 300 may be pulled toward the inner side surface of the housing 110 in the optical axis direction (Z-axis direction).

Meanwhile, contrary thereto, the first magnetic body disposed in the housing 110 may be a first pulling magnet 730, the second magnetic body disposed in the holder 330 may be a first pulling yoke 710, and both the first magnetic body and the second magnetic body disposed in the holder 330 may be a first pulling magnet 730.

Referring to FIGS. 6 and 7, a rotating plate 200 may be disposed between the reflection module 300 and an inner side surface of the housing 110. Even when the rotating plate 200 exists between the reflection module 300 and the housing 110, the rotating plate 200 may have a through-hole 210 so that attractive force may act between the reflection module 300 and an inner side surface of the housing 110 in the optical axis direction (the Z-axis direction), and the first pulling yoke 710 and the first pulling magnet 730 may face each other directly through the through-hole 210.

The rotating plate 200 may be pulled toward the inner side surface of the housing 110 in the optical axis direction (the Z-axis direction) by the attractive force acting between the first pulling yoke 710 disposed in the housing 110 and the first pulling magnet 730 disposed in the holder 330 with the reflection module 300.

A ball member may be disposed between the rotating plate 200 and the reflection module 300 and between the rotating plate 200 and the housing 110. In detail, a first ball member B1 may be disposed between the housing 110 and the rotating plate 200, and a second ball member B2 may be disposed between the rotating plate 200 and the holder 330 of the reflection module 300.

The first ball member B1 may include a plurality of ball members disposed to be spaced apart in a first axis (X-axis) perpendicular to the optical axis (Z-axis), and the second ball member B2 may include a plurality of ball members disposed to be spaced apart in a second axis (Y-axis) perpendicular to the optical axis (Z-axis) and the first axis (X-axis).

The housing 110 and the rotating plate 200 may respectively have a receiving groove in which the first ball member B1 is accommodated on surfaces facing each other in an optical axis direction (Z-axis direction). For example, the rotating plate 200 may have a first receiving groove GR1 on a surface facing an inner side surface of the housing 110 in the optical axis direction (Z-axis direction), and the inner side surface of the housing 110 may have a second receiving groove GR2 on a surface facing the rotating plate 200 in the optical axis direction (Z-axis direction), and the first receiving groove and the second receiving groove may include a plurality of receiving grooves disposed to be spaced apart in a first axis (X-axis) perpendicular to the optical axis (Z-axis).

The first ball member B1 may be disposed between the first receiving groove GR1 and the second accommodating groove GR2, and may be stably disposed without being separated therefrom by the attractive force between the first pulling yoke 710 and the first pulling magnet 730.

The rotating plate 200 and the reflection module 300 may respectively have a receiving groove in which a second ball member B2 is accommodated on surfaces facing each other in an optical axis direction (Z-axis direction). For example, the rotating plate 200 may have a third receiving groove GR3 on a surface facing the reflection module 300 in the optical axis direction (Z-axis direction), and the reflection module 300 may have a fourth receiving groove GR4 on a surface facing the rotating plate 200 in the optical axis direction (Z-axis direction), and the third receiving groove GR3 and the fourth receiving groove GR4 may include a plurality of receiving grooves disposed to be spaced apart in a second axis (Y-axis) perpendicular to the optical axis (Z-axis) and the first axis (X-axis).

The second ball member B2 may be disposed between the third receiving groove GR3 and the fourth receiving groove GR4, and may be stably disposed without being separated from the third receiving groove GR3 and the fourth receiving groove GR4 by the attractive force between the first pulling yoke 710 and the first pulling magnet 730.

According to an embodiment of the present disclosure, the camera module 1000 may correct hand-shake during image capturing by rotating the reflection module 300. For example, when hand-shake occurs during image capturing, the hand-shake may be corrected by applying a relative displacement corresponding to the hand-shake to the reflection module 300.

Figure 12A:
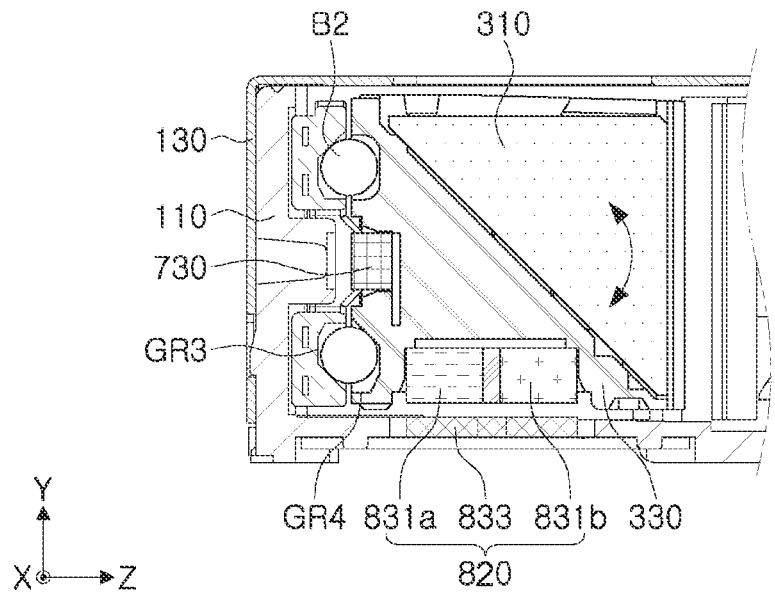
FIGS. 12A to 12C are views illustrating a state in which a reflection module of a camera module rotates about a first axis (X-axis) as a rotation axis according to an embodiment of the present disclosure.
Figure 12B:
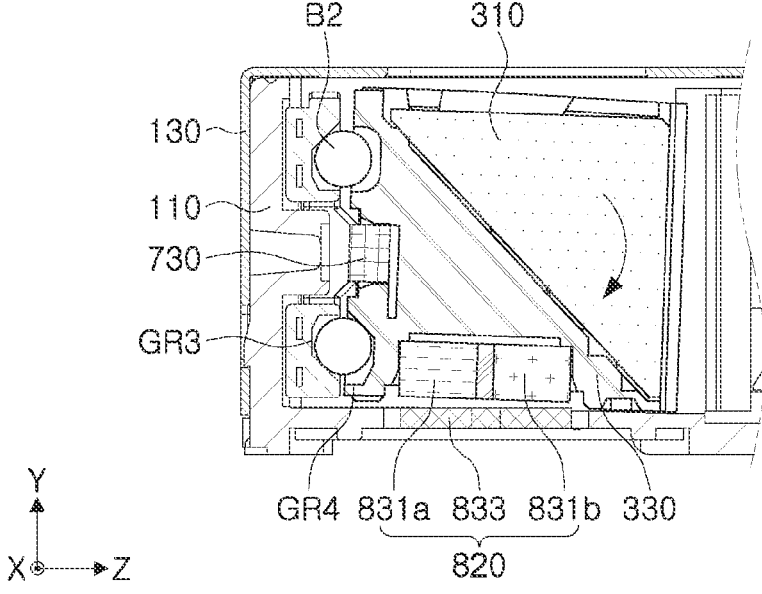
Figure 12C:
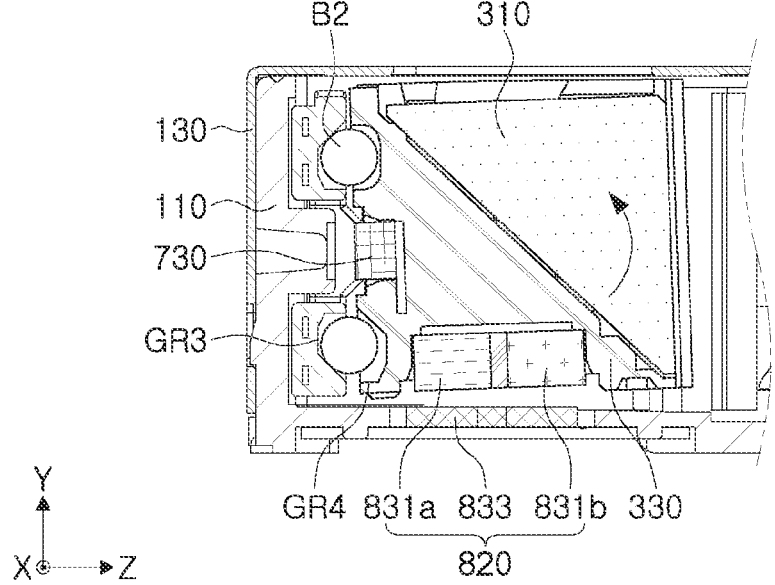
Figures 13A, 13B:
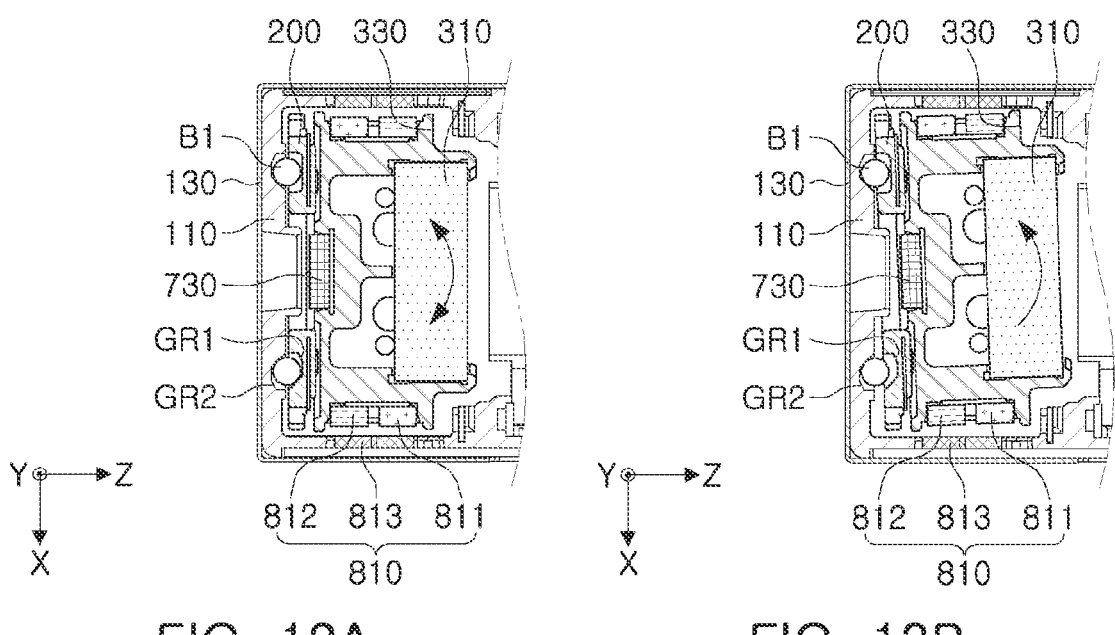
FIGS. 13A to 13C are views illustrating a state in which a reflection module of a camera module rotates about a second axis (Y axis) as a rotation axis according to an embodiment of the present disclosure.
Figure 13C:
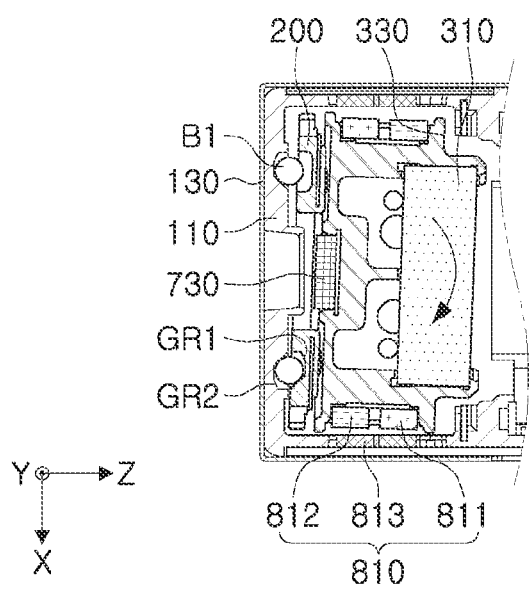

FIGS. 12A to 12C are diagrams illustrating a state in which a reflection module of a camera module according to an embodiment of the present disclosure rotates around a first axis (X-axis) as a rotation axis, and FIGS. 13A to 13C are diagrams illustrating a state in which a reflection module of a camera module according to an embodiment of the present disclosure rotates around a second axis (Y axis) as a rotation axis.

The reflection module 300 may rotate using a first axis (X-axis) and a second axis (Y-axis) perpendicular to the optical axis (Z-axis) as rotational axes. The reflection module 300 may rotate relative to the housing 110 together with the rotating plate 200 using the first axis (X-axis) as a rotation axis. In addition, the reflection module 300 may rotate relative to the rotating plate 200 using the second axis (Y-axis) as a rotation axis.

Referring to FIG. 6, a first ball member B1 may be disposed between the housing 110 and the rotating plate 200, and the first ball member B1 may include a plurality of ball members disposed to be spaced apart in the first-axis direction (X-axis direction). Accordingly, the rotating plate 200 may be rotated using the first axis (X-axis) as a rotation axis while being supported by the first ball member B1 disposed to be spaced apart in the first-axis direction (X-axis direction). At the same time, relative rotation of the rotating plate 200 with respect to the housing 110 using the second axis (Y-axis) as a rotation axis may be limited.

Referring to FIG. 7, a second ball member B2 may be disposed between the rotating plate 200 and the reflection module 300, and the second ball member B2 may include a plurality of ball members disposed to be spaced apart in the second axis direction (Y-axis direction). Accordingly, the reflection module 300 may be rotated using the second axis (Y axis) as a rotation axis while being supported by the second ball member B2 disposed to be spaced apart from each other in the second axis direction (Y-axis direction). At the same time, relative rotation of the reflection module 300 with respect to the rotating plate 200 using the first axis (X-axis) as a rotation axis may be limited.

In addition, when the rotation plate 200 rotates relative to the housing 110 using the first axis (X-axis) as a rotation axis, the reflection module 300 may rotate relative with respect to the housing 110 using the first axis (X-axis) as a rotation axis together with the rotating plate 200. That is, the relative rotation of the reflection module 300 with respect to the rotating plate 200 using the first axis (X-axis) as a rotation axis is limited, but the relative rotation of the reflection module 300 with respect to the housing 110 using the first axis (X-axis) as a rotation axis together with the rotating plate 200 is not limited.

According to an embodiment of the present disclosure, as described above, the camera module 1000 may include a driving unit for rotating the reflection module 300 based on a first axis (X-axis) and a second axis (Y-axis), perpendicular to the optical axis (Z-axis).

In detail, the camera module 1000 may include a first driving unit 810 and a second driving unit 820 for rotating the reflection module 300 about a first axis (X-axis) and a second axis (Y-axis), perpendicular to the optical axis (Z-axis), as rotational axes. In this specification, for convenience of explanation, the driving unit for rotating the reflection module 300 about the second axis (Y-axis), as a rotation axis is defined to as a first driving unit 810 and the driving unit for rotating reflection module 300 about the first axis (X-axis), as a rotating axis is defined as a second driving unit 820.

The first driving unit 810 and the second driving unit 820 may be VCM actuators using electromagnetic force between a magnet and a coil as a driving force.

Figure 10:
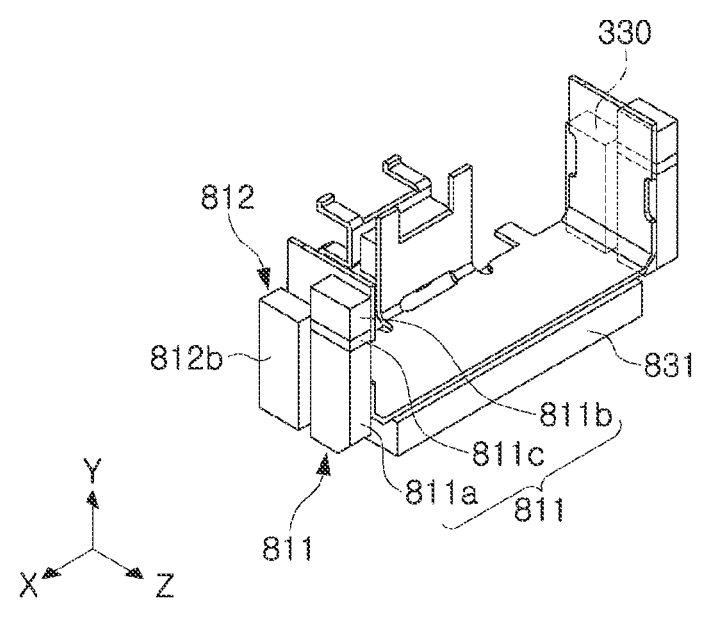
FIG. 10 is a perspective view of a holder on which first to third magnets are mounted according to an embodiment of the present disclosure.
Figure 11:
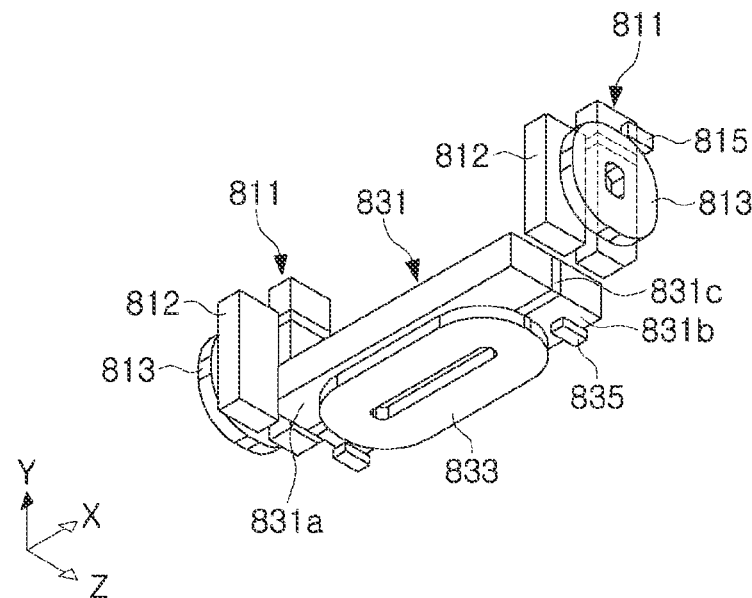
FIG. 11 is a diagram illustrating a dispositional relationship of a magnet, a coil, and a position sensor according to an embodiment of the present disclosure.

FIG. 10 is a perspective view of a holder on which first to third magnets are mounted according to an embodiment of the present disclosure, and FIG. 11 is a diagram illustrating a dispositional relationship of a magnet, a coil, and a position sensor according to an embodiment of the present disclosure.

The first driving unit 810 may include a first magnet 811, a second magnet 812, and a first coil 813.

The first magnet 811 and the second magnet 812 may be disposed in the reflection module 300, and for example, the first magnet 811 and the second magnet 812 may be disposed on a side surface of the holder based on the drawing. The first magnet 811 and the second magnet 812 are disposed on the reflection module 300, which rotates, so that the first magnet 811 and the second magnet 812 may be moving members.

The first coil 813 may be disposed in the housing 110 to face the first magnet 811 and the second magnet 812 in a direction perpendicular to the optical axis direction (Z-axis direction), in the first axis direction (X-axis direction) based on the drawing. In detail, the housing 110 may include a through-hole 113 on a side surface thereof, and the first coil 813 may be disposed in the housing 110, for example, in the substrate 170 coupled to the housing 110 and/or while being mounted on the substrate 170, which may be coupled to the housing 110. The first coil 813 may face the first magnet 811 and the second magnet 812 in the first axis direction (X-axis direction) through the through-hole 113. Since the first coil 813 is disposed in the housing 110, the first coil 813 may be a fixed member.

The first magnet 811 and the second magnet 812 may be provided in plural and mounted on both side surfaces of the holder 330, respectively. In other words, the first magnet 811 may be mounted on both side surfaces of the holder 330 and the second magnet 812 may be mounted on both side surfaces of the holder 330. In addition, even in the case of the first coil 813, a plurality of first magnets 811 and second magnets 812 disposed on both side surfaces of the holder 330 may be provided to face each other.

As disclosed herein, the first and second magnets 811 and 812 may be moving members disposed in the reflection module 300 and the first coil 813 may be a fixed member disposed in the housing 110, however the disclosure is not so limited. For example, in contrast thereto, the first and second magnets 811 and 812 may be fixed members disposed in the housing 110 and the first coil 813 may be a moving member disposed in the reflection module 300.

According to an embodiment of the present disclosure, the first magnet 811 may be a driving and sensing magnet, and the second magnet 812 may be a driving magnet.

Conventionally, the driving magnet and the sensing magnet are manufactured separately, but according to an embodiment of the present disclosure, the driving magnet may be manufactured separately in two parts, and the sensing magnet may be integrally manufactured with any one of the two driving magnets.

The first magnet 811 may have a length in a second axis direction (Y-axis direction). In addition, the first magnet 811 may be magnetized in the second direction (Y-axis direction). For example, the first magnet 811 may include a first polarity region 811$a$ and a second polarity region 811$b$ in the second axis direction (Y-axis direction), and a neutral zone 811$c$ may be provided between the first polarity region 811$a$ and the second polarity region 811$b$. The first polarity region 811$a$ may have an N pole or an S pole, and the second polarity region 811$b$ may have an S pole or N pole, opposite to that of the first polarity region 811$a$.

The first magnet 811 may include a driving region (hereinafter, a first region) and a sensing region (hereinafter, a second region). The first region and the second region may be sequentially provided in the second axis direction (Y-axis direction).

The first region may include a portion, facing the first coil 813, and the second region may include a portion, facing a first position sensor 815 to be described later. For example, the first region may include a first polarity region 811$a$, and the second region may include a neutral region 811$c$ and a second polarity region 811$b$. However, the first region may include a second polarity region 811$b$, and the second region may include a neutral region 811$c$ and a first polarity region 811$a$.

In addition, in the first magnet 811, the first polarity region 811$a$ may have a longer length, in the second axis direction (Y-axis direction) than the second polarity region 811$b$. That is, the polarity region included in the first region may be configured to have a larger area than the polarity region included in the second region, so that sufficient driving force may be secured.

The second magnet 812 may have a length in the second axis direction (Y-axis direction). In addition, a surface, facing the first coil 813 of the second magnet 812 may include only one of the first polarity region 812$a$ and the second polarity region 812$b$, and may not have a neutral region. The first polarity region 812$a$ may have an N pole or an S pole, and the second polarity region 812$b$ may have an S pole or N pole, opposite to that of the first polarity region 812$a$.

According to an embodiment of the present disclosure, the first coil 813 may be disposed to face regions of different polarities of the first magnet 811 and the second magnet 812.

For example, when the first region of the first magnet 811, facing the first coil 813 is a first polarity region 811$a$, the second magnet 812 may be provided with a second polarity region 812$b$, opposite to the first polarity, and accordingly, the first coil 813 may be disposed to face regions of different polarities of the first magnet 811 and the second magnet 812.

Conversely, when the first region of the first magnet 811 facing the first coil 813 is a second polarity region 811$b$, a surface of the second magnet 812 facing the first coil 813 may be provided with only the first polarity region 812$a$, opposite to the second polarity, and accordingly, the first coil 813 may be disposed to face regions of different polarities of the first magnet 811 and the second magnet 812.

The first magnet 811 and the second magnet 812 may be mounted in the holder 330 to have a predetermined gap in an optical axis direction (a Z-axis direction). In detail, in the first magnet 811 and the second magnet 812, the first polarity region 811$a$ of the first magnet 811 and the second polarity region 812$b$ of the second magnet 812 may be disposed to be spaced apart in the optical axis direction (the Z-axis direction). Accordingly, the first coil 813 may face a region of different polarities of the first magnet 811 and the second magnet 812.

The first magnet 811 may have a longer length in a second axis direction (in a Y-axis direction) than the second magnet

812. Since the first magnet 811 is a magnet in which a portion of the driving magnet and a sensing magnet are integrally manufactured, and the second magnet 812 is a portion of the driving magnet, the first magnet 811 may be formed to have a length in the second axis direction (the Y-axis direction) longer than the second magnet 812 by as much as that of a second region. That is, the neutral region 811$c$ and the second polarity region 811$b$ of the first magnet 811 may be provided in the second axis direction (the Y-axis direction).

According to an embodiment of the present disclosure, since a sensing magnet is integrally manufactured with a portion of a driving magnet, while manufacturing the driving magnet, separated into two parts, manufacturing and attachment tolerances of the conventional driving magnet and sensing magnet are improved, thereby improving the position sensing accuracy of the reflection module 300. Detailed contents related thereto will be described later.

The second driving unit 820 may include a third magnet 831 and a second coil 833.

The third magnet 831 may be disposed on a reflection module 300, and for example, the third magnet 831 may be disposed on a bottom surface of the holder 330 based on the drawing. Since the third magnet 831 is disposed on the reflection module 300, which is rotating, the third magnet 831 may be a moving member.

The second coil 833 may be disposed in the housing 110 to face the third magnet 831 in a direction perpendicular to the optical axis direction (the Z-axis direction), that is, the second axis direction (the Y-axis direction) based on the drawing. In detail, the housing 110 may include a through-hole 115 on a bottom surface thereof, and the second coil 833 may be disposed in the housing 110, for example, in a substrate 170 coupled to the housing 110 and/or mounted on the substrate 170, which may be coupled to the housing 110. The second coil 833 may face the third magnet 831 in the second axis direction (the Y-axis direction) through the through-hole 115. Since the second coil 833 is disposed in the housing 110, the second coil 833 may be a fixed member.

Meanwhile, in the present specification, an embodiment in which the third magnet 831 is a moving member disposed on the reflection module 300 and the second coil 833 is a fixed member disposed on the housing 110 is described, but on the contrary, an embodiment in which the third magnet is a fixed member disposed on the housing 110 and the second coil 833 is a moving member disposed in the reflection module 300 is also described.

The third magnet 831 may have a length in a first axis direction (an X-axis direction). In addition, the third magnet 831 may be magnetized in an optical-axis direction (a Z-axis direction). For example, the third magnet 831 may include a first polarity region 831$a$ and a second polarity region 831$b$ in the optical-axis direction (the Z-axis direction), and a neutral zone 831$c$ may be provided between the first polarity region 831$a$ and the second polarity region 831$b$. The first polarity region 831$a$ may have an N pole or an S pole, and the second polarity region 831$b$ may have an S pole or N pole, opposite to that of the first polarity region 831$a$.

According to an embodiment of the present disclosure, in the camera module 1000, a closed loop control method detecting and feedbacking a position of the reflection module 300 may be used. To this end, the camera module 1000 may include a first position sensor 815 and a second position sensor 835 for sensing the position of the reflection module 300.

For example, the first position sensor 815 and the second position sensor 835 may be Hall sensors.

The first position sensor 815 may be disposed on a housing 110. In detail, the housing 110 may include a through-hole 113 on a side surface thereof, and the first position sensor 815 may be mounted on the housing 110, for example, in a substrate 170 coupled to the housing 110 and/or mounted on the substrate 170, which may be coupled to the housing 110, together with the first coil 813. Also, the first position sensor 815 may be mounted outside the first coil 813 on the substrate 170. Accordingly, when the first position sensor 815 senses the position, an influence of electromagnetic force between the first coil 813 and the first and second magnets 811 and 812 may be minimized.

The first position sensor 815 may be disposed to face the reflection module 300 through the through-hole 113. For example, the first position sensor 815 may be disposed to face one surface of the holder 330 on which the first and second magnets 811 and 813 are disposed in a first axis direction (X-axis direction). The first position sensor 815 may be disposed to face a second region of the first magnet 811, more specifically, a neutral region 811c of the first magnet 811 in the first axis direction (X-axis direction). The first position sensor 815 may be disposed to face the neutral region 811c of the first magnet 811 in an initial position, but when the reflection module 300 rotates, may be disposed to face a portion of a first polarity region 811a or a second polarity region 811b.

In an embodiment of the present disclosure, since the first magnets 811 are respectively disposed on both side surfaces of the holder 330, the first position sensors 815 may be provided in two position sensors to face each of the first magnets 811 disposed on both side surfaces of the holder 330.

The first position sensor 815 may be disposed to face the first magnet 811, and when the reflection module 300 rotates around the first axis (X-axis) as a rotation axis, may detect a change in direction of the reflection module 300 in a second direction (Y-axis direction).

In addition, according to an embodiment of the present disclosure, in order to sense a position of the reflection module 300 in the second axis direction (the Y-axis direction) with higher sensitivity, the first magnet 811 may be disposed in a position, further from the rotation axis in an optical axis direction (Z-axis direction) than the second magnet 812.

The rotation axis of the reflection module 300 may be formed between the housing 110 and the holder 330. In more detail, a first ball member B1 and a second ball member B2 may be disposed between surfaces of the housing 110 and the holder 330 facing in the optical axis direction (Z-axis direction), and the first ball member B1 and the second ball member B2 may serve as rotational axes of the reflection module 300. Meanwhile, since a greater movement occurs in a position, further from the rotation axis, the first magnet 811 may be disposed in a position, further from the rotation axis than the second magnet 812, and accordingly, sensitivity of the reflection module 300 may be improved.

In the embodiment including the first magnet 811 and the second magnet 812 of the present disclosure described above, it is possible to reduce a cumulative tolerance of manufacturing and attachment tolerances when the conventional driving magnet and sensing magnet are separately manufactured and provided, so that distribution of sensing values of the reflection module 300 in the second axis direction (Y-axis direction) may be improved.

A second position sensor 835 may also be disposed on the housing 110. The housing 110 may include a through-hole 115 on a bottom surface thereof, and the second position sensor 835 may be disposed on the housing 110, for example, in a substrate 170 coupled to the housing 110 and/or mounted on the substrate 170, which may be coupled to the housing 110, together with the second coil 833. In addition, the second position sensor 835 may also be provided outside the second coil 833 to minimize an influence of electromagnetic force between the second coil 813 and the third magnet 831 when sensing the position.

The second position sensor 835 may be disposed to face the reflection module 300 through the through-hole 115. For example, the second position sensor 835 may be disposed to face the bottom surface of the holder 330 on which the third magnet 831 is disposed in a second axis direction (Y-axis direction). The second position sensor 835 may be disposed to face the neutral region 831c of the third magnet 831 in the second axis direction (Y-axis direction). In addition, the second position sensor 835 may be provided in plural and disposed on both sides of the second coil 833.

The second position sensor 835 may be disposed to face the third magnet 831, and when the reflection module 300 rotates about the second axis (Y axis), as a rotation axis, a change in the position of the reflection module 300 in the first axis direction (X-axis direction) may be detected.

A lens module 400 may be disposed behind the reflection module 300 in the internal space of the housing 110. According to an embodiment of the present disclosure, the camera module 1000 may adjust a focus during imaging by moving the lens module 400 in the optical axis direction (Z-axis direction).

The lens module 400 may be supported by an inner side surface of the housing 110 while being disposed in the internal space of the housing 110. For example, the lens module 400 may be pulled toward the internal surface of the housing 110 in a second axis direction (Y-axis direction), perpendicular to the optical axis direction (Z-axis direction).

To this end, a magnetic body may be disposed on at least one of surfaces of the housing 110 and the lens module 400 facing each other in the second axis direction (Y-axis direction). For example, a third magnetic body may be disposed on the housing 110 to face a fourth magnet 910 to be described later. Alternatively, a third magnetic body may be disposed in the housing 110 and a fourth magnetic body may be disposed in the lens module 400.

A third ball member B3 may be disposed between the lens module 400 and the housing 110. In detail, the third ball member B3 may be disposed between a carrier 430 and the housing 110. The third ball member B3 may include a plurality of ball members disposed to be spaced apart in the optical axis (Z-axis), which is a longitudinal direction of the carrier 430 and a plurality of ball members disposed to be spaced apart in the first axis (X-axis), which is a width direction of the carrier 430. The third ball member B3 may guide movement of the lens module 400 in the optical axis direction (Z-axis direction) with respect to the housing 110.

Guide grooves in which the third ball member B3 is accommodated may be provided on a surface of the carrier 430 and the housing 110 facing each other in the second axis direction (the Y-axis direction), respectively. For example, the carrier 430 may have a first guide groove GU1 on a surface facing the second axis direction (Y-axis direction), and the housing 110 may have a second guide groove GU2 on a surface facing the second axis direction (Y-axis direction).

The first guide groove GU1 and the second guide groove GU2 may include a plurality of receiving grooves disposed to be spaced apart from each other in the optical axis (Z-axis) and the first axis (X-axis). In addition, the first guide groove GU1 and the second guide groove GU2 may be formed in a shape having a length in the optical axis direction (Z-axis direction) to guide the movement of the lens module 400 in the optical axis direction (Z-axis direction).

The third ball member B3 may be disposed between the first guide groove GU1 and the second guide groove GU2, and may be stably disposed without being separated from the first guide groove GU1 and the second guide groove GU2 by the attractive force between the housing and the lens module 400 acting in the second axis direction (Y-axis direction). For example, the attractive force between the housing and the lens module 400 acting in the second axis direction (Y-axis direction) may be exerted by the third magnetic body disposed in the housing 110 to face the fourth magnet 910 disposed on the carrier 430 in the second axis direction (Y-axis direction). For example, the third magnetic body may be a magnetic yoke disposed between second guide grooves GU2 spaced apart in the optical axis direction (Z-axis direction). The third magnetic body may be disposed in plural on both sides of the housing in the first axis direction (X-axis direction) to face the fourth magnets 910 disposed on both sides of the lens module 400 in the first axis direction (X-axis direction).

The third ball member B3 may roll in the first guide groove GU1 and the second guide groove GU2 in a state of being disposed between the first guide groove GU1 and the second guide groove GU2. Therefore, when a driving force is generated in the optical axis direction (Z-axis direction) by a third driving unit 900 to be described later, the lens module 400 may move in the optical axis direction (Z-axis direction) by the third ball member B3.

According to an embodiment of the present disclosure, the camera module 1000 may include a third driving unit 900 to move the lens module 400 in the optical axis direction (Z-axis) as described above. For example, the third driving unit 900 may be a VCM actuator using electromagnetic force between a magnet and a coil as driving force.

The third driving unit 900 may include a fourth magnet 910 and a third coil 930. The third driving unit 900 may move the lens module 400 in a direction of the optical axis (Z-axis) by using electromagnetic force between the fourth magnet 910 and the third coil 930 as driving force.

The fourth magnet 910 may be disposed in the lens module 400. For example, the fourth magnet 910 may be disposed on a side surface of a carrier 430. Since the fourth magnet 910 is disposed on the moving carrier 430, the fourth magnet 910 may be a moving member.

The third coil 930 may be disposed in the housing 110 to face the fourth magnet 910 in a direction, perpendicular to the optical axis direction (Z-axis direction) and in the first axis direction (X-axis direction) based on the drawing. In detail, the housing 110 may include a through-hole 117 on a side surface thereof, and the third coil 930 may be disposed in the housing 110, for example, in a substrate 170 coupled to the housing 110 and/or mounted on the substrate 170, which may be coupled to the housing 110. The third coil 930 may face the fourth magnet 910 in the second axis direction (Y-axis direction) through the through-hole 117. Since the third coil 930 is disposed in the housing 110, the third coil 930 may be a fixed member.

The fourth magnet 910 may include a plurality of magnets, and the plurality of magnets may be divided and disposed on both side walls of the carrier 430. Also, the third coil 930 may include a plurality of coils to correspond to the plurality of magnets of the fourth magnet 910.

As disclosed herein, an embodiment in which a fourth magnet 910 is a movable member disposed in the lens module 400 and a third coil 930 is a fixed member disposed on the housing 110 may be described, but on the contrary thereto, an embodiment in which the fourth magnet 910 is a fixed member disposed on the housing 110 and the third coil 930 is a moving member disposed in the lens module 400 is also included in this disclosure.

According to an embodiment of the present disclosure, in the camera module 1000, a closed-loop control method for detecting a position of the lens module 400 and feedback of the same may be used. To this end, the camera module 1000 may include a third position sensor 950 for detecting the position of the lens module 400.

For example, the third position sensor 950 may be a Hall sensor.

The third position sensor 950 may be disposed in a housing 110. In detail, the housing 110 may include a through-hole 117 on a side surface thereof, and the third position sensor 950 may be disposed in the housing 110, for example, in a substrate 170 coupled to the housing 110 and/or mounted on the substrate 170, which may be coupled to the housing 110, together with the third coil 930.

The third position sensor 950 may be disposed to face the lens module 400 through the through-hole 117. For example, the third position sensor 950 may be disposed to face one surface of a carrier 430 on which a fourth magnet 910 is disposed in a first axis direction (X-axis direction).

In addition, the third position sensor 950 may be provided as one or may be provided in a number corresponding to a plurality of magnets constituting the fourth magnet 910 and disposed to face each magnet. In addition, the third position sensor 950 may be disposed inwardly or outwardly of the third coil 930.

As set forth above, in the camera module according to an embodiment of the present disclosure, position sensing accuracy of the reflection module may be improved.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:

a housing;

a reflection module comprising a reflection member and a holder on which the reflection member is mounted, the reflection module being disposed in the housing and rotating about an axis perpendicular to an optical axis;

a first magnet and a second magnet mounted on a surface of the holder;

a first coil mounted on the housing to face the first magnet and the second magnet; and a first position sensor mounted on the housing to face the first magnet.

2. The camera module of claim 1, wherein the first magnet comprises a first region including a portion facing the first coil and a second region including a portion facing the first position sensor sequentially in a second axis direction perpendicular to the optical axis.

3. The camera module of claim 2, wherein the first magnet includes a first polarity region, a neutral region, and a second polarity region sequentially in the second axis direction, and wherein the first region comprises the first polarity region, and the second region comprises the neutral region and the second polarity region.

4. The camera module of claim 3, wherein the first polarity region has a longer length than the second polarity region in the second axis direction.

5. The camera module of claim 3, wherein the second magnet includes a surface facing the first coil provided only with a second polarity region.

6. The camera module of claim 5, wherein the second magnet is disposed to be spaced apart from the first polarity region of the first magnet in an optical axis direction.

7. The camera module of claim 1, wherein the first magnet has a longer length than the second magnet in a second axis direction, perpendicular to the optical axis.

8. The camera module of claim 1, wherein a rotation axis of the reflection module is formed between the housing and the holder, and wherein the first magnet is disposed in a position further from the rotation axis than the second magnet in an optical axis direction.

9. The camera module of claim 1, further comprising:

a third magnet mounted on an other surface of the holder; and a second coil and a second position sensor mounted on the housing to face the third magnet.

10. The camera module of claim 9, wherein the first magnet, the second magnet, and the first coil generate driving force for rotating the reflection module about a second axis perpendicular to the optical axis, and wherein the third magnet and the second coil generate driving force for rotating the reflection module about a first axis perpendicular to the optical axis.

11. The camera module of claim 10, wherein the first position sensor senses a position of the reflection module in the second axis direction, and wherein the second position sensor senses a position of the reflection module in the first axis direction.

12. A reflection module, comprising:

a reflection member;

a holder on which the reflection member is mounted;

a housing in which the holder is accommodated; and a driving unit for rotating the holder, based on a first axis and a second axis perpendicular to each other, wherein the driving unit comprises:

a first coil and a second coil disposed in the housing; and three magnets disposed in the holder, wherein the first coil is disposed to face two magnets among the three magnets, wherein the second coil is disposed to face the other one magnet among the three magnets, and wherein any one of the two magnets is facing a first position sensor.

13. The reflection module of claim 12, wherein the first magnet comprises a first polarity region, a neutral region, and a second polarity region sequentially in the second axis direction, and wherein the second magnet comprises the first polarity region or the second polarity region.

14. The reflection module of claim 13, wherein the first magnet comprises a first region including a portion facing the first coil and a second region including a portion facing the first position sensor, and wherein the first region includes the first polarity region, and the second region includes the neutral region and the second polarity region.

15. The reflection module of claim 13, wherein the first coil is disposed to face a region of different polarities of the first magnet and the second magnet.

16. The reflection module of claim 13, wherein the first polarity region has a longer length than the second polarity region in the second axis direction.

17. A camera module, comprising:

a holder rotatable relative to a housing about a first axis perpendicular to an optical axis;

first and second driving magnets disposed on a side surface of the holder facing the first axis direction and spaced apart from each other in the optical axis direction; and a position sensor facing the first driving magnet in the first axis direction, wherein the first driving magnet is longer than the second driving magnet in a second axis direction perpendicular to the first axis and the optical axis, and wherein the first driving magnet extends beyond the second driving magnet in the second axis direction to face the position sensor.

18. The camera module of claim 17, wherein the first driving magnet comprises a first polarity and a second polarity spaced apart from the first polarity by a neutral region, and wherein the first polarity faces the second driving magnet, and the second polarity faces the position sensor.

19. The camera module of claim 17, further comprising a driving coil facing the first and second driving magnets in the first axis direction, wherein electromagnetic force between the driving coil and the first and second driving magnets rotates the holder about the second axis.

20. The camera module of claim 17, further comprising a reflection member disposed on the holder to change a direction of incident light.

* * * * *